Patented Oct. 11, 1938

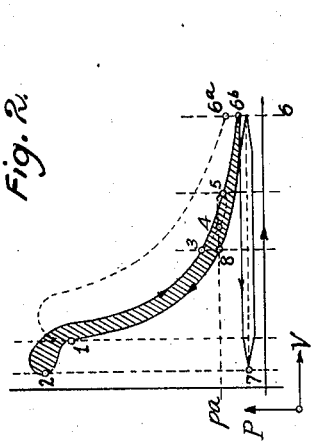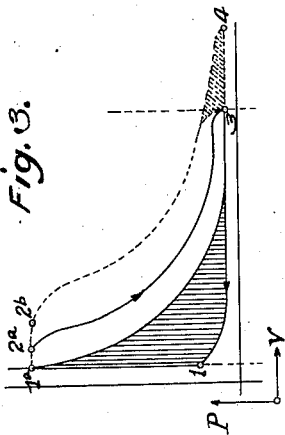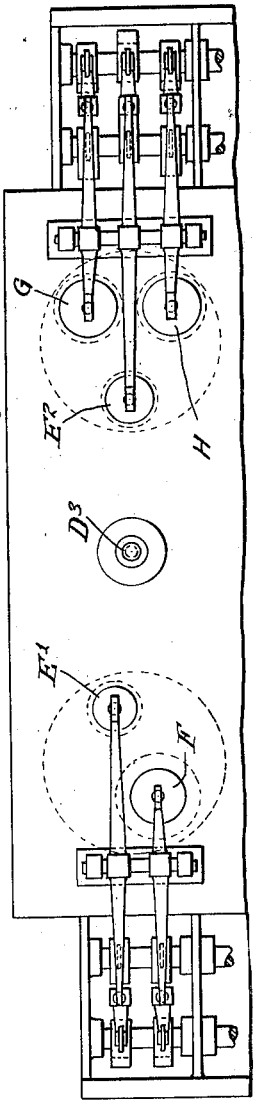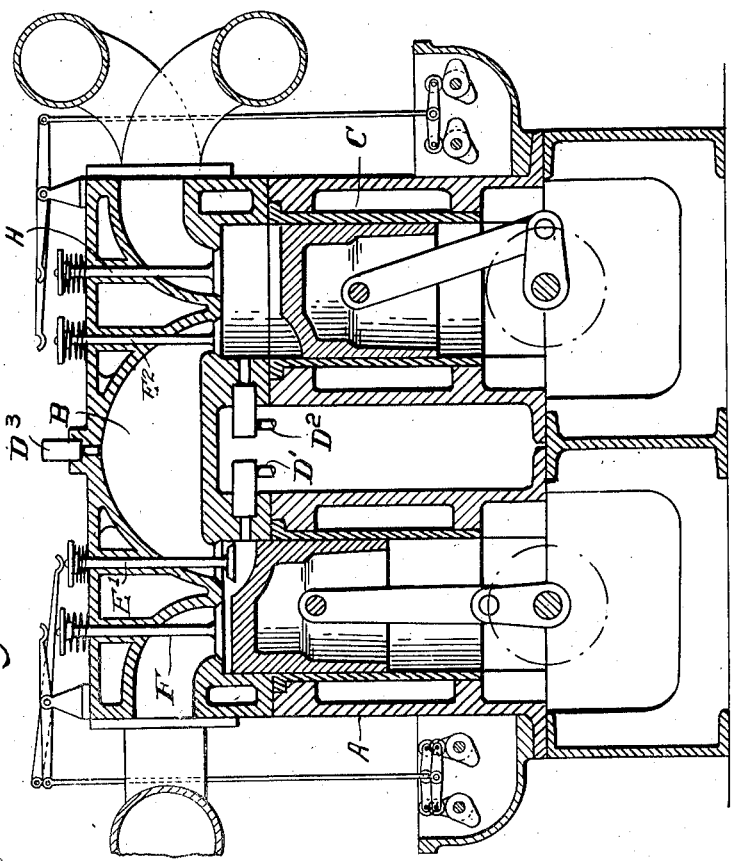

2,132,646

UNITED STATES PATENT OFFICE 2,132,646

METHOD OF OPERATING INTERNAL COMBUSTION ENGINES HAVING REGULATION OF CHARGE QUANTITIES

Paul Rieppel, Munich, and Siegfried Grantz, Augsburg, Germany

Application June 6, 1935, Serial No. 25,527
In Germany June 8, 1934

7 Claims. (Cl. 123—1)

Our invention relates to a method of operating internal combustion engines having regulation of charge quantities.

To this end internal combustion engines have been proposed, in which the compression of the air charge took place by means of a separated cylinder.

Our invention is relating to a similar engine, the total combustion air charge being compressed externally.

In all known engines of this type the air quantity needed for burning the fuel in the main engine is produced in an extra compressor, which is driven by the main engine itself or by an auxiliary motor.

It is an object of our present invention to omit the said extra compressor and to simplify thereby the plant.

To this end according to our present invention the total air charge is compressed in an auxiliary engine which serves simultaneously as compressor as well as internal combustion engine. This auxiliary engine may be named "internal combustion compressor". The air compressed by the said internal combustion compressor is partially dislodged into a storage reservoir, partially it remains in the internal combustion compressor and gives power output therein. From the storage reservoir the air may be led into the cylinders of the main engine.

Therefore a power plant constructed in accordance with our present invention contains only three parts: 1, the internal combustion compressor, 2, the storage reservoir and 3, the main engine.

It is an additional object of our present invention thereby likewise to dispense with intercalated coolers and the air heater, to better the total thermal efficiency and to be enabled to control the air temperature in a desired extent.

Figure 1 is a transverse vertical section of an internal combustion engine embodying the present method of operation.

Figure 2 is a diagram showing the relation of the pressure to the volume for the internal combustion compressor.

Figure 3 is a diagram showing the relation of the pressure to the volume for the main internal combustion engine.

Figure 4 is a fragmentary top plan of the engine.

Referring to the drawing, and first to Fig. 1, the letter A designates the main internal combustion engine having the usual piston slidable therein. An intake valve E' is disposed in the head of the engine, and an exhaust valve F is also disposed in the head. These valves may be moved to open or closed position in the usual manner.

An internal combustion compressor C is disposed at one side of the main engine A and has a piston slidable therein, and an intake and an exhaust valve G and H respectively are carried by the head of the engine. A valve $E^2$ controls passage of gases from the cylinder of the compressor C to a reservoir B which is disposed between the two members A and C. The engine A has a fuel supply means D' discharging thereinto, and the compressor C has a similar supply means $D^2$ discharging thereinto. A third fuel supply means $D^3$ discharges into the reservoir B.

Fig. 2 shows a diagram of the combustion-power compressor C, in which the pressure is entered in dependence on the volume. If the combustion-power compressor operates according to the four-cycle process, then air is drawn by suction from the outside through the valve H from the point 7 to 6. After the reversal of stroke at the point 6 and the closure of the valve H, the air is compressed by the upward-moving piston. At the point 1 the valve $E^2$ opens, and a portion of the air is expelled into the collector B. When the valve $E^2$ is closed at the point 2, there is sprayed into the compressor cylinder fuel which burns up there. The expansion of the combustion gases, by which the compressor piston is driven, proceeds according to the heavily drawn pressure curve as far as the point 6b. At this point the exhaust valve G opens, and the combustion gases are expelled by the piston as far as the point 7. Here the new four-cycle process commences from the beginning.

If the combustion-power compressor operates according to the two-cycle process with a loading-up of pressure pa, then during the expansion stroke the outlet parts (for example slits) open already at the point 3. The pressure then declines further according to the curve in broken lines, until at the point 4 previously compressed air is forced into the cylinder through the opened inlet parts. The point 5 corresponds to the reversal of stroke of two-cycle operation. At the point 4 the inlet parts close again in the return movement, and at the point 3 the outlet parts, whereupon the compression takes place according to the heavy line as far as the point 1, at which the valve $E^2$ opens. At the point 2 the latter is closed again, exactly as in the four-cycle process, and fuel is sprayed in, which burns. The gases of combustion expand again as far as the point 3. The hatched surface serves for covering the mechanical losses in the combustion-power compressor. For comparison there is inserted in the drawing, from the point 1 to the point 6a, in a broken line, the combustion and expansion curve of a standard Diesel engine.

Fig. 3 shows a diagram of the main engine, in which the pressure is likewise entered in dependence on the volume. At the point 1 the inlet valve $E^1$ opens, and the gases from the collector B flow into the operating cylinder until, according to the desired filling, the inlet valve $E^1$ closes again at the point 2a or 2b. Thereupon the combustion and expansion take place according to the solid line 2a—3 or according to the broken line 2b—3. At the point 3 there opens the exhaust valve F, which remains open almost as far as the upper dead point of the piston, i. e. as far as the point 1. For comparison with the standard Diesel engine its normal compression curve is here inserted in the drawing from the point 3 to 1a. The perpendicularly hatched surface below this curve shows the energy which has to be expended for the compression in the case of a standard Diesel engine and which can consequently not be derived at the engine shaft as effective power. In the case of the combustion-power engine, this energy is gained for the effective power. The obliquely hatched curve between 3 and 4 represents the lost energy which results in case of greater filling, since at the opening of the exhaust valve at the point 3 the gases still have a comparatively high pressure which is not completely utilized.

The new method of operation is as follows:

When the pistons of the internal combustion compressor are in the bottom dead center, the air charge for the internal combustion compressor itself and that for the main engine are contained in the cylinders of the internal combustion compressor. When during the upwards stroke of the pistons the desired compression pressure is reached, the air quantity for the main engine is discharged into the storage reservoir. In the rest of air remaining in the cylinder the combustion takes place in the same manner as in a normal combustion engine. The combustion is followed by the expansion of the rest of gas remaining in the cylinder, up to the moment, when the exhaust orifices are opened, or when during the next stroke the burnt gases are expelled, corresponding to a four stroke or two stroke cycle as the case may be.

After the discharge of the cylinders the intake or filling of the new charge begins and the working cycle is repeated.

The piston displacement of the internal combustion compressor must be great enough to receive the air quantity needed for the main engine and that for the internal combustion compressor.

By the air quantity needed for the main engine the air quantity working in the internal combustion compressor is fixed. The latter must have such a quantity, that when compressed and burnt it produces so much energy as is necessary to compress and dislodge the air of the main engine and to cover the losses in the internal combustion compressor.

It is not at all necessary to fix the dimensions of the cylinders in accordance with the above explained quantity of air of normal pressure, but the air may also be introduced as in supercharged engines in a prior compressed state. By dislodging the air in the top dead center the disadvantageous pressure peaks known in normal supercharged engines are obviated.

Substantially the compression of the total air charge takes place polytropically and in a single stage, a disadvantageous process for a normal piston compressor on account of the high temperatures, the high re-expansion and the great power consumption.

However in the present event this measure is advisable because even the high temperatures are necessary and do not trouble in a combustion engine. The re-expansion is negligible, for, what in a compressor is dead space, is in the present event compression space of the combustion engine and furthermore the great power consumption is transferred in the form of heat to the air, consequently not lost.

The greater power consumption in single stage air compression is reduced by the fact, that the expansion ratio of the gaseous remainders within the cylinder of the internal combustion compressor is greater than in a Diesel engine, the weight of air remaining in the cylinder being reduced by that of the air expelled in the top dead center.

Finally also the mechanical losses are smaller, when the compression takes place in the motor itself than in the event when two separated engines are running. Consequently the total efficiency of the method of operation is better than that of the known plants consisting of motor, compressor and air heater.

Moreover by our present invention essential practical advantages are obtained as may now be explained.

A danger in all internal combustion engines with compression of the air charge by means of a separated cylinder is, that the combusting air before its entrance into the main engine cannot be heated to such an extent that in starting the engine self-ignition takes place. The exhaust gases of the auxiliary engine being in the most cases insufficient, an additional heating for instance by injection of fuel oil or by late compression is necessary. In the one case in addition to the air heater a further constructional part similar to a combustion chamber is necessary, in the other case a definite compression ratio must be present, which is greater the cooler the engine, therefore very great on the start. Hereby two disadvantages are caused.

1. High compression in the main engine reduces its power output, the compression process being only oscillating energy. Even on the start the maximum charge is necessary and by the compression in the cylinder of the main engine the expansion curve is raised. The consequence is that great exhaust losses result.

2. On account of the high exhaust losses the air quantity needed for a maximum output at low speed becomes considerably greater than for a maximum output at normal speed. Therefore the dimensions of the compressor must be very great in order to have the same maximum output at various speeds as necessary and important to propel vehicles.

Whereas, when according to the spirit of the present invention the air is compressed in the internal combustion compressor, a part of the air quantity required for the main engine may be burnt in the internal combustion compressor. By adjusting the fuel oil quantity and the injection timing the operator is enabled to begin the burning in such a way that a desired part of the air quantity defined for the main engine is consumed. Hereby air heaters and late compressions may be dispensed with and furthermore it is possible to expand in the main engine to such an extent, that the compressor need not be increased in its dimensions in order to have air enough for the start.

Although in the manner as explained a certain preliminary combustion for the air defined for the main engine is admissible, it may be advisable to burn the air remaining in the internal combustion compressor preferably even during discharging the other component of charge. Thereby the effect may result, that the energy needed for the discharging process is produced directly by the heat quantity transferred within the fuel oil and not by the pistons. In this way the piston need not to travel up to the position given by the remainder air quantity and the final compression pressure and temperature and this is important, because the compression volume remaining in the internal combustion compressor after discharge of the charge defined for the main engine eventually may be only 2–3% of this piston displacement. In this way an extreme limit of the dead space may be reached and furthermore a separation of both components of charge in the cylinder head of the internal combustion compressor may be effected in such a way, that the one part by its expansion during the combustion dislodges the other part or in such a way that by a turbulence caused in the beginning moment of the discharge the pure air components are replaced by burnt gaseous components.

What we claim is:

1. In an internal combustion engine, a main cylinder and an auxiliary cylinder, pistons slidable in each of said cylinders and driven independently of each other, a storage chamber connecting the two cylinders and adapted to receive a compressed charge from the auxiliary cylinder and to deliver it into the main cylinder, a fuel nozzle discharging into said auxiliary cylinder, a fuel nozzle discharging into said storage chamber, and a fuel nozzle discharging into said main cylinder.

2. In an internal combustion engine, a main cylinder and an auxiliary cylinder, pistons slidable in each of said cylinders and driven independently of each other, a fuel nozzle arranged in the wall of the auxiliary cylinder to admit fuel for driving the piston of said auxiliary cylinder, and a storage chamber connecting the two cylinders and adapted to receive a compressed charge from the auxiliary cylinder and to deliver said charge into the main cylinder.

3. In an internal combustion engine, a main cylinder and an auxiliary cylinder, pistons slidable in each of said cylinders and driven independently of each other, a storage chamber connecting the two cylinders and adapted to receive a compressed charge from the auxiliary cylinder and to deliver said charge into the main cylinder, a fuel nozzle arranged in the wall of the main cylinder to admit fuel for driving the piston of said main cylinder, and a second fuel nozzle arranged in the wall of the auxiliary cylinder to admit fuel for driving the piston of the auxiliary cylinder.

4. In an internal combustion engine, a main cylinder and an auxiliary cylinder, pistons slidable in each of said cylinders and driven independently of each other, a storage chamber connecting the two cylinders and adapted to receive a compressed charge from the auxiliary cylinder and to deliver said charge into the main cylinder, and a fuel nozzle arranged in the wall of the storage chamber to admit fuel into said chamber.

5. In an internal combustion engine, a main cylinder and an auxiliary cylinder, pistons slidable in each of said cylinders and driven independently of each other, a storage chamber connecting the two cylinders and adapted to receive a compressed charge from the auxiliary cylinder and to deliver said charge into the main cylinder, a fuel nozzle arranged in the wall of the auxiliary cylinder to admit fuel for driving the auxiliary piston.

6. In an internal combustion engine, a main cylinder and an auxiliary cylinder, pistons slidable in each of said cylinders and driven independently of each other, a storage chamber connecting the two cylinders and adapted to receive a compressed charge from the auxiliary cylinder and to deliver said charge into the main cylinder, each cylinder having an inlet and an outlet valve and a gear operating the outlet valve of the auxiliary cylinder to discharge a portion of the cylinder contents in a compressed state into the storage chamber and to retain the remainder of the contents in said auxiliary cylinder for driving the auxiliary piston.

7. In an internal combustion engine, a main cylinder and an auxiliary cylinder, pistons slidable in each of said cylinders and driven independently of each other, a storage chamber connecting the two cylinders and adapted to receive a compressed charge from the auxiliary cylinder and to deliver said charge into the main cylinder, each cylinder having an inlet and an outlet valve and a gear operating the outlet valve of the auxiliary cylinder to discharge a portion of the cylinder contents thereof in a compressed state into the storage chamber and to retain the remainder in said auxiliary cylinder for driving the auxiliary piston, and another gear operating the inlet valve of the main cylinder to close at various times.

PAUL RIEPPEL.
SIEGFRIED GRANTZ.